(12) United States Patent
Liu et al.

(10) Patent No.: US 9,134,770 B2
(45) Date of Patent: Sep. 15, 2015

(54) EXPANSION APPARATUS FOR SERIAL ADVANCED TECHNOLOGY ATTACHMENT DUAL IN-LINE MEMORY MODULE DEVICE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Lei Liu, Shenzhen (CN); Guo-Yi Chen, Shenzhen (CN)

(73) Assignees: HONG FU JIN PRECISION INDUSTRY (ShenZhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 258 days.

(21) Appl. No.: 13/928,387

(22) Filed: Jun. 27, 2013

(65) Prior Publication Data

US 2014/0321044 A1   Oct. 30, 2014

(30) Foreign Application Priority Data

Apr. 25, 2013   (CN) .......................... 2013101472950

(51) Int. Cl.
  *H05K 7/20*   (2006.01)
  *G06F 1/18*   (2006.01)
(52) U.S. Cl.
  CPC ...................................... *G06F 1/185* (2013.01)
(58) Field of Classification Search
  CPC ........................................... G06F 1/181–1/187

USPC ...................................................... 361/679.32
See application file for complete search history.

(56) References Cited

U.S. PATENT DOCUMENTS

| 6,215,668 | B1 * | 4/2001 | Hass et al. ..................... 361/759 |
| 6,295,565 | B1 * | 9/2001 | Lee ................. 710/301 |
| 7,465,170 | B2 * | 12/2008 | Gay et al. ......................... 439/65 |
| 7,602,611 | B2 * | 10/2009 | Peng et al. ...................... 361/728 |
| 8,199,515 | B2 * | 6/2012 | Bandholz et al. ............. 361/760 |
| RE44,628 | E * | 12/2013 | Charles et al. ................ 710/303 |
| 2004/0027797 | A1 * | 2/2004 | Yen ................. 361/684 |
| 2008/0096412 | A1 * | 4/2008 | Poh et al. ...................... 439/326 |
| 2012/0170195 | A1 * | 7/2012 | Chang ......................... 361/679.4 |

* cited by examiner

*Primary Examiner* — Anthony Q Edwards
(74) *Attorney, Agent, or Firm* — Novak Druce Connolly Bove + Quigg LLP

(57) ABSTRACT

An expansion apparatus includes a shell defining an opening, a baseboard mounted in the shell, and a serial advanced technology attachment dual in-line memory module (SATA DIMM) device. A memory slot, a power converter, a hard disk drive (HDD) signal expander, and a connector exposed through the opening are all arranged on the baseboard. The memory slot includes a protrusion, first power pins connected to the power converter, first ground pins, and first signal pins connected to the HDD signal expander. A control chip and storage chips are all arranged on the SATA DIMM device. An edge connector and a notch are arranged along a bottom edge of the SATA DIMM device to be detachably engaged in the memory slot. The edge connector includes second power pins connected to the control chip and the storage chips, second ground pins, and second signal pins connected to the control chip.

9 Claims, 2 Drawing Sheets

EXPANSION APPARATUS FOR SERIAL ADVANCED TECHNOLOGY ATTACHMENT DUAL IN-LINE MEMORY MODULE DEVICE

BACKGROUND

1. Technical Field

The present disclosure relates to an expansion apparatus for a serial advanced technology attachment dual in-line memory module (SATA DIMM) device.

2. Description of Related Art

Solid state drives (SSD) store data on chips instead of on magnetic or optical discs and are used for adding storage capacity. One type of SSD has the form factor of a dual in-line memory module (DIMM) device and is called a serial advanced technology attachment (SATA) DIMM device. The SATA DIMM device can be inserted into a memory slot of a motherboard, for receiving voltages from the motherboard through the memory slot and receiving hard disk drive (HDD) signals through SATA connectors arranged on the SATA DIMM module and connected to a SATA connector on the motherboard. However, the number of the memory slots is limited, thus the memory slots of the motherboard can only receive a limited quantity of SATA DIMM devices. Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the drawings, is illustrated by way of example and not by way of limitation. References to "an" or "one" embodiment in this disclosure are not necessarily to the same embodiment, and such references mean "at least one".

Figure 1:
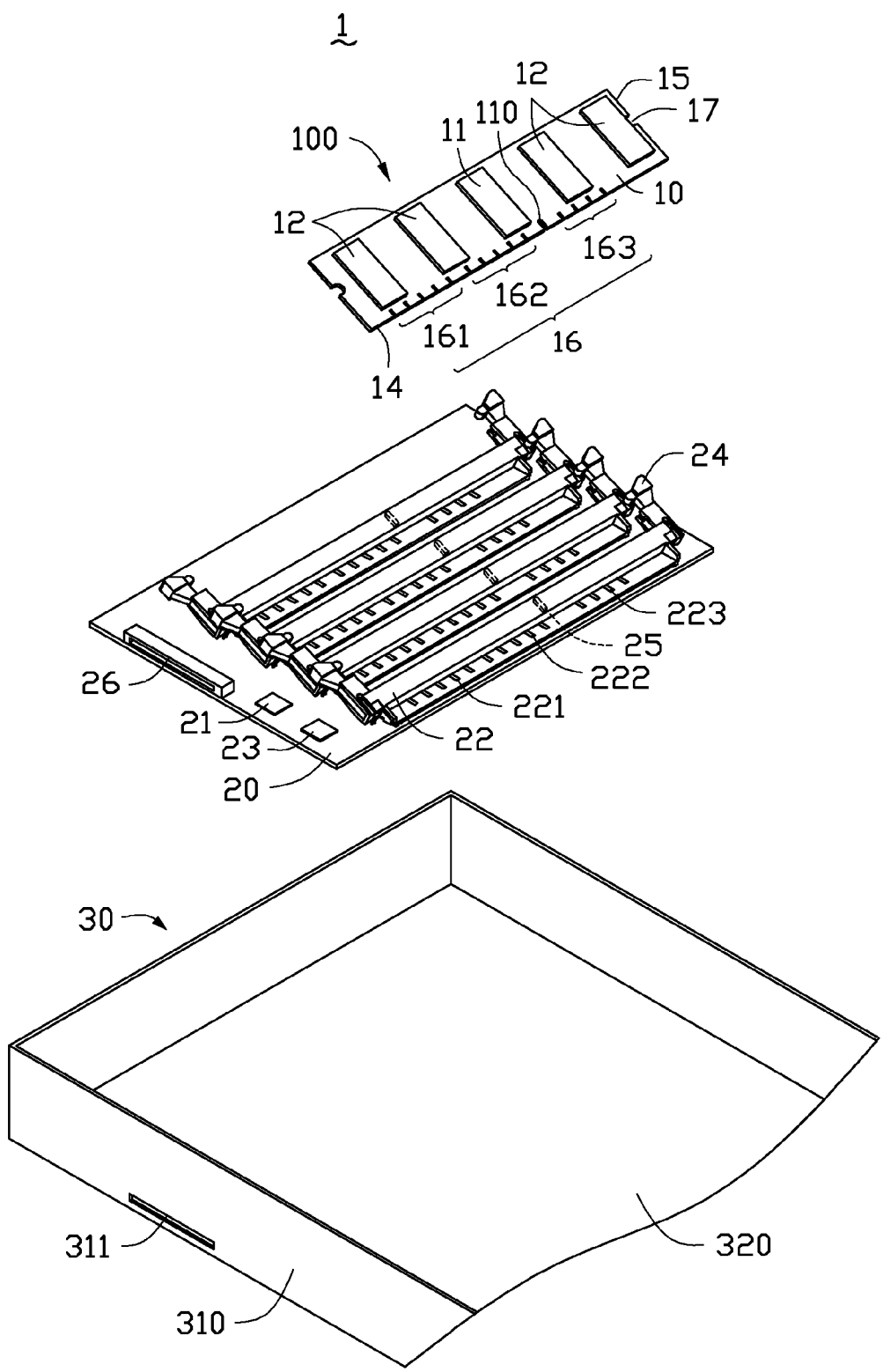
FIG. 1 is an exploded, isometric view of an expansion apparatus for a serial advanced technology attachment dual in-line memory module (SATA DIMM) device in accordance with an embodiment of the present disclosure.
Figure 2:
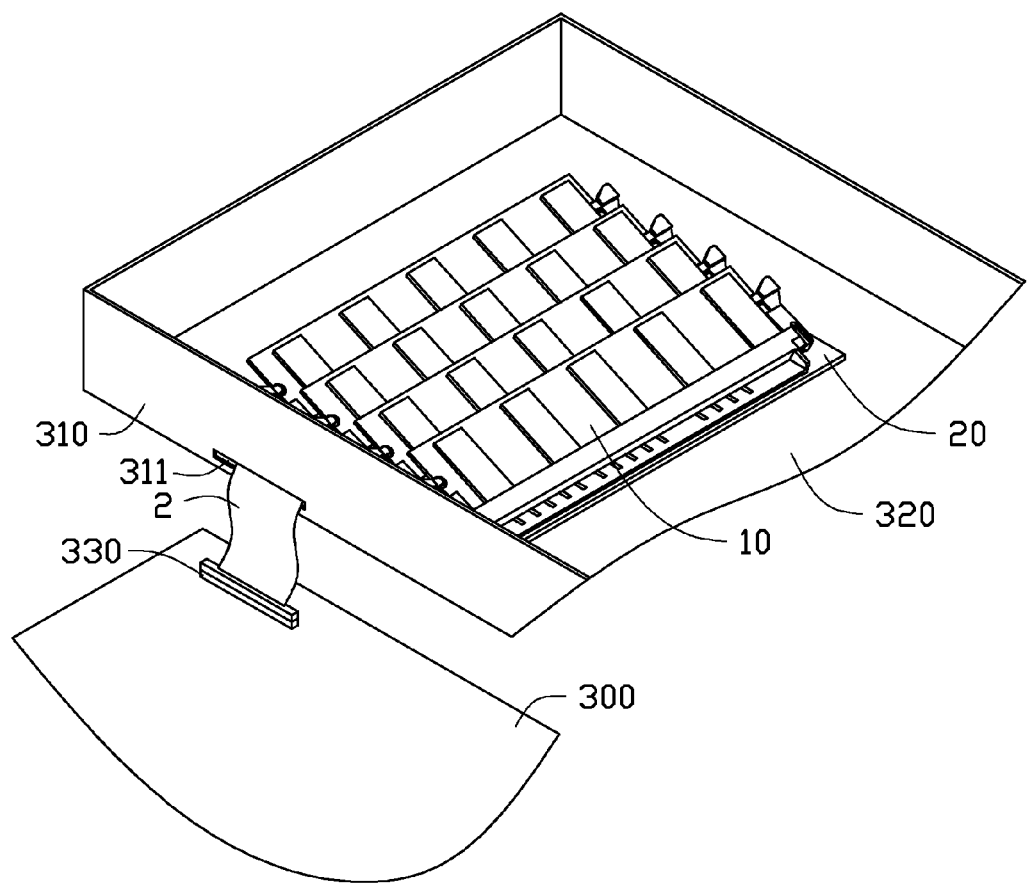
FIG. 2 is an assembled, isometric view of the expansion apparatus of FIG. 1.

FIGS. 1 and 2 show an expansion apparatus 1 in accordance with an embodiment including a shell 30, a baseboard 20 mounted in the shell 30, and a plurality of serial advanced technology attachment dual in-line memory module (SATA DIMM) devices 100.

The SATA DIMM device 100 includes a substantially rectangular circuit board 10. A control chip 11 and a plurality of storage chips 12 connected to the control chip 11 are all arranged on the circuit board 10. An edge connector 16 is arranged along a bottom edge 14 of the circuit board 10. The edge connector 16 includes a plurality of power pins 161, a plurality of ground pins 162, and four signal pins 163. The signal pins 163 include a pair of signal input pins and a pair of signal output pins. The power pins 161 are connected to the control chip 11 and the storage chips 12. The signal pins 163 are connected to the control chip 11. The ground pins 162 are connected to a ground layer (not shown) of the circuit board 10. A notch 110 is defined in the bottom side 14 of the circuit board 10 and located between the ground pins 162 and the signal pins 163. The circuit board 10 defines two grooves 17 in two opposite ends 15.

A plurality of memory slots 22, such as double data rate type two (DDR2) or double data rate type three (DDR3), a hard disk drive (HDD) signal expander, such as a serial attached small computer system interface (SAS) expander 21, a power converter 23, and a connector, such as an SAS connector 26 are all arranged on the baseboard 20 which is a circuit board. In one embodiment, each memory slot 22 is slantingly arranged on the baseboard 20, with an angle of 25 degrees formed between the baseboard 20 and the memory slot 22. In other embodiments, the SAS expander 21 may be a SATA expander. Two fixing elements 24 are arranged on two ends of each memory slot 22. The memory slot 22 includes a protrusion 25, a plurality of power pins 221, a plurality of ground pins 222, and four signal pins 223. The signal pins 223 include a pair of signal input pins and a pair of signal output pins. The power pins 221 are connected to the power converter 23. The signal pins 223 are connected to the SAS expander 21. The ground pins 222 are connected to a ground layer (not shown) of the baseboard 20. The power converter 23 and the SAS expander 21 are connected to the SAS connector 26. In one embodiment, there are four memory slots 22. In other embodiments, the number of the memory slots 22 can be changed as needed.

An opening 311 is defined in a sidewall 310 of the shell 30. When the baseboard 20 is accommodated in the shell 30 and located on a bottom wall 320 of the shell 30, the SAS connector 26 is exposed through the opening 311, to be electrically connected to an SAS connector 330 of a motherboard 300 by a cable 2. Size of the shell 30 is the same as size of a known HDD, to replace the known HDD in the chassis.

In use, the edge connector 16 is inserted into one of the memory slots 22, and the protrusion 25 is engaged in the notch 110. The power pins 161, the ground pins 162, and the signal pins 163 of the edge connector 16 are electrically connected to the power pins 221, the ground pins 222, and the signal pins 223 of the memory slot 22, respectively. The fixing elements 24 of the memory slot 22 are engaged in the grooves 17 of the SATA DIMM device 100, to secure the SATA DIMM device 100 to the memory slot 22. The number of the SATA DIMM devices 100 connected to the memory slots 22 can be changed as needed. The shell 30 with the baseboard 20 and the SATA DIMM device 100 is mounted in the chassis. The SAS connector 26 is connected to the SAS connector 330 of the motherboard 300 by the cable 2. Thus, capacity of the motherboard 300 is expanded.

When the motherboard 300 receives power, the power converter 23 converts a voltage received from the motherboard 300 through the SAS connector 26 and provides the converted voltage to the control chip 11 and the storage chips 12 through the power pins 221 and 161. At the same time, the SAS expander 21 receives an HDD control signal, such as an SAS signal, from the motherboard 300 through the SAS connector 26 and inverse multiplex the received SAS signal to a plurality of SAS signals. Each expanded SAS signal is provided to the control chip 11 of one SATA DIMM device 100 mounted on one memory slot 22 through the signal pins 223 and 163. The control chip 11 controls the storage chips 12 to store data according to the received SAS signal. Other SATA DIMM devices 100 can be mounted in the memory slots 22 as the same way as mentioned above.

The expansion apparatus 1 receives a voltage and an HDD control signal from the motherboard 300 and transmits them to the control chip 11 and the storage chips 12 through the power pins 221 and the signal pins 223. The expansion apparatus 1 can conveniently expand storage capacity of the motherboard 300 by connecting a plurality of SATA DIMM devices 100 to the memory slots 22 of the baseboard 20, to avoid mounting memory slots on the motherboard 300, thus saving space of the motherboard 300.

Even though numerous characteristics and advantages of the disclosure have been set forth in the foregoing description, together with details of the structure and function of the disclosure, the disclosure is illustrative only, and changes may be made in detail, especially in matters of shape, size, and the arrangement of parts within the principles of the disclosure to the full extent indicated by the broad general meaning of the terms in which the appended claims are expressed.

What is claimed is:

1. An expansion apparatus comprising:
a shell comprising a sidewall defining an opening;
a baseboard mounted in the shell, wherein a plurality of memory slots is mounted on the baseboard, a connector is mounted on the baseboard and exposed through the opening of the shell to be connected to a motherboard for receiving a voltage and a hard disk drive (HDD) control signal, an HDD signal expander is mounted on the baseboard and connected to the connector, and a power converter is mounted on the baseboard and connected to the connector, each of the plurality of memory slots comprises a protrusion, a plurality of first power pins electrically connected to the power converter, a plurality of first ground pins, and four first signal pins connected to the HDD signal expander; and
a plurality of serial advanced technology attachment dual in-line memory module (SATA DIMM) devices each comprising a circuit board, a control chip arranged on the circuit board, a plurality of storage chips arranged on the circuit board and connected to the control chip, and an edge connector and a notch arranged along a bottom edge of the circuit board to be detachably engaged in one of the plurality of memory slots, the edge connector comprising a plurality of second power pins connected to the control chip and the plurality of storage chips, a plurality of second ground pins, and four second signal pins connected to the control chip;
wherein in response to the edge connector of the SATA DIMM device being engaged in one of the plurality of memory slots of the baseboard, the protrusion is engaged in the notch, the plurality of first power pins of the memory slot is connected to the plurality of second power pins of the SATA DIMM device, the plurality of first ground pins of the memory slot is connected to the plurality of second ground pins of the SATA DIMM device, and the four first signal pins of the memory slot is connected to the four second signal pins of the SATA DIMM device.

2. The expansion apparatus of claim 1, wherein size of the shell is the same as a HDD.

3. The expansion apparatus of claim 1, wherein the first signal pins of the memory slot comprises a pair of signal input pins and a pair of signal output pins, the second signal pins of the SATA DIMM device comprises a pair of signal input pins and a pair of signal output pins.

4. The expansion apparatus of claim 1, wherein two grooves are defined in two opposite ends of the circuit board of each of the plurality of SATA DIMM devices, two fixing elements are arranged on two ends of each of the plurality of memory slots of the baseboard, to engage in the grooves of the circuit board.

5. The expansion apparatus of claim 1, wherein the plurality of memory slots are double data rate type two memory slots.

6. The expansion apparatus of claim 1, wherein the plurality of memory slots are double data rate type three memory slots.

7. The expansion apparatus of claim 1, wherein the plurality of memory slots are slantingly arranged on the baseboard.

8. The expansion apparatus of claim 7, wherein an angle of 25 degrees is formed between the plurality of memory slots and the baseboard.

9. The expansion apparatus of claim 1, wherein the HDD signal expander is a serial attached small computer system interface (SAS) expander, and the connector is a SAS connector.

* * * * *